Dec. 14, 1926.

W. H. KEMPER

FARMING MACHINERY

Filed Oct. 8, 1924

Inventor

William H. Kemper.

Dec. 14, 1926.  
W. H. KEMPER  
FARMING MACHINERY  
Filed Oct. 8, 1924  
1,610,610  
4 Sheets-Sheet 3
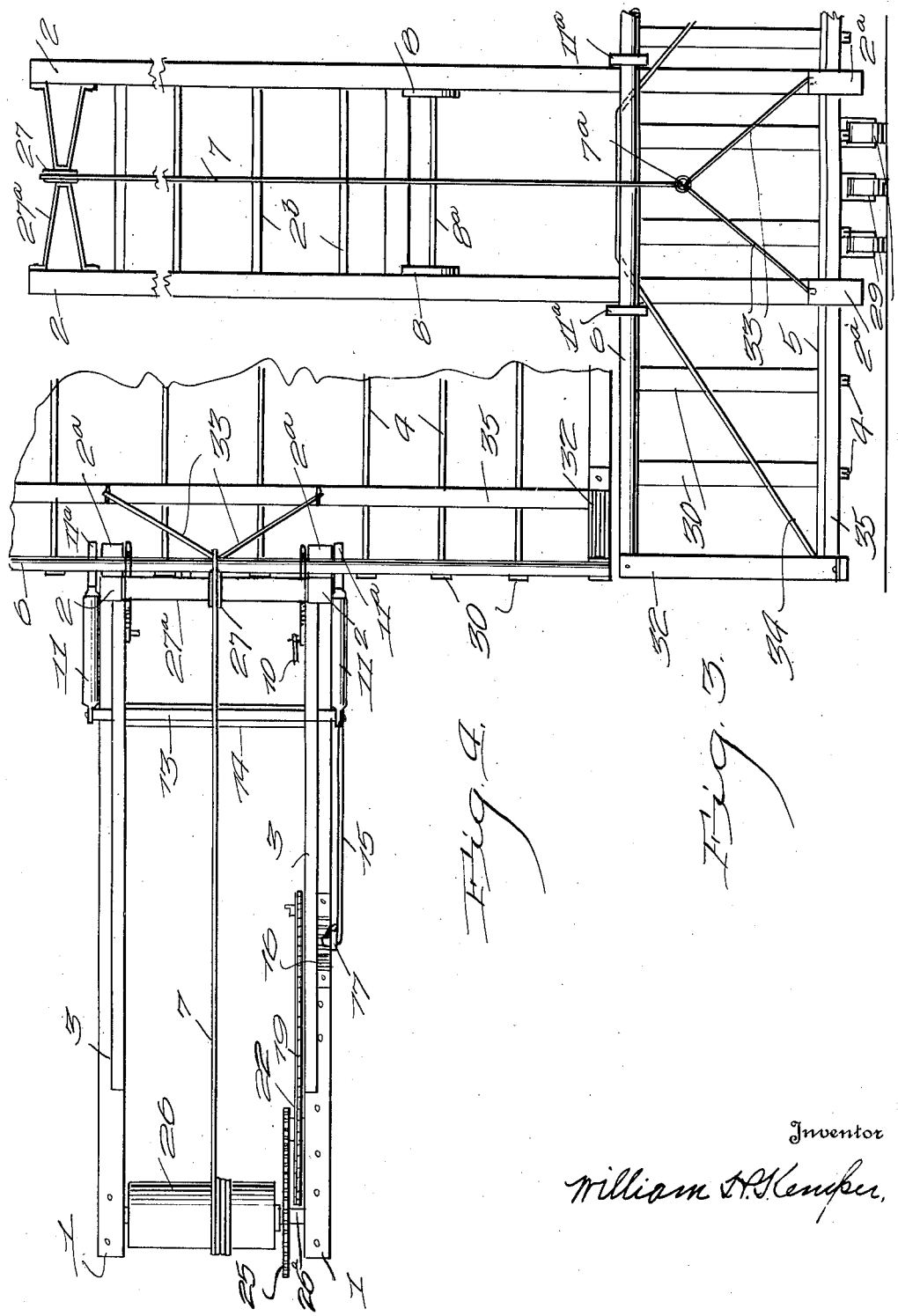
Inventor  
William H. Kemper,

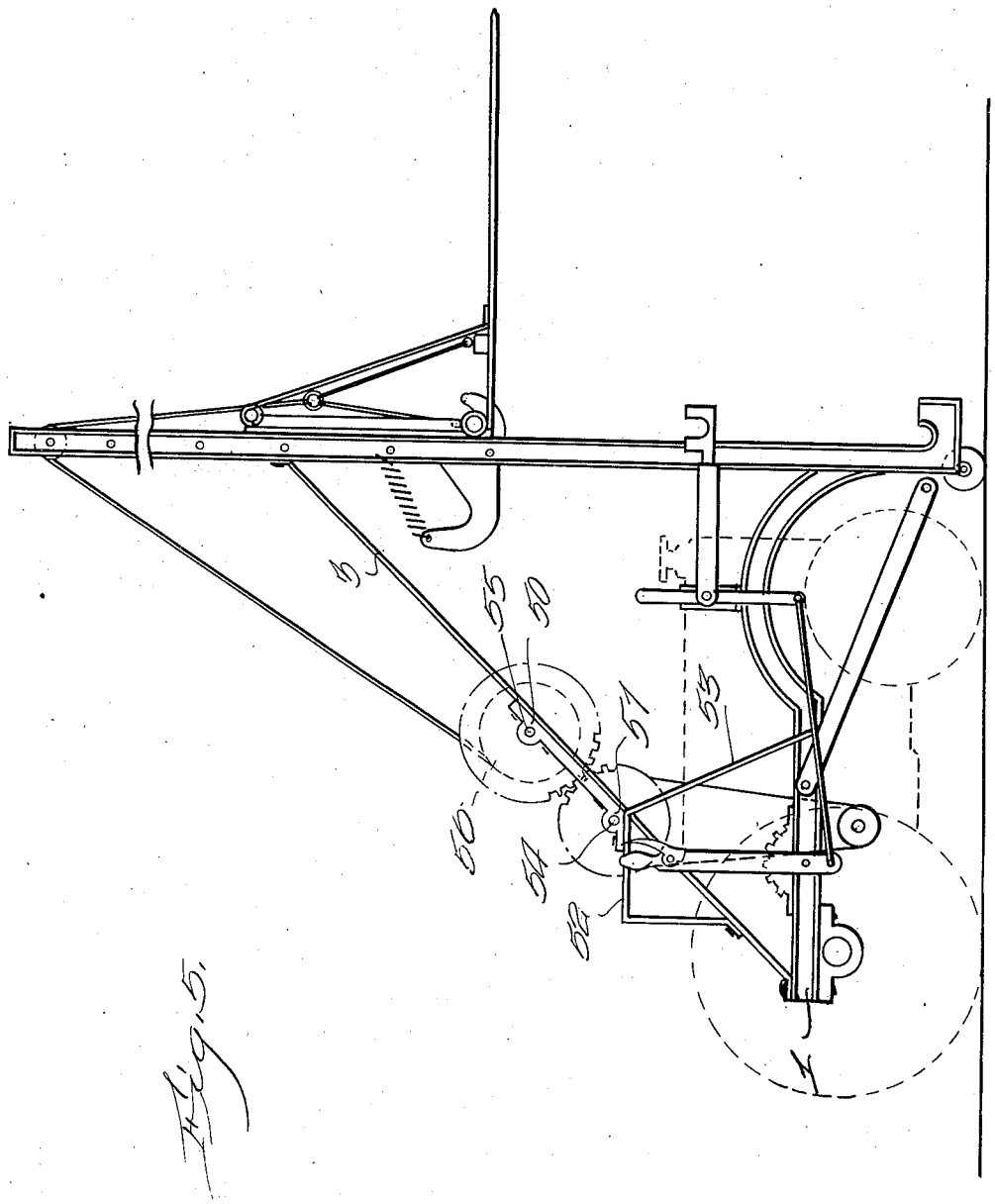

Patented Dec. 14, 1926.

1,610,610

UNITED STATES PATENT OFFICE.

WILLIAM H. KEMPER, OF MONTGOMERY, ALABAMA.

FARMING MACHINERY.

Application filed October 8, 1924. Serial No. 742,305.

This invention relates to farm machinery and particularly to an attachment for a tractor to serve as a hay and grain rake, stacker and loader.

An object of this invention is to provide an attachment to a tractor which may be put on in the nature of a harness on a horse by simply lowering it onto the tractor and locking a journal box on the rear axle of the tractor and slipping a chain over a sprocket and which attachment will serve the triple purpose of a rake, a stacker and a loader.

A further object of this invention is to improve and combine the elements of each of the above three machines into a simplified unitary machine adaptable at will to function in any one of the three capacities.

With the above and such other objects in view as may hereinafter more fully appear, I have invented the device illustrated in the accompanying drawings, in which:

Figure 3 is a front elevational view thereof.

Figure 4 is a top plan view thereof.

Figure 5 is a modification.

Figure 1:
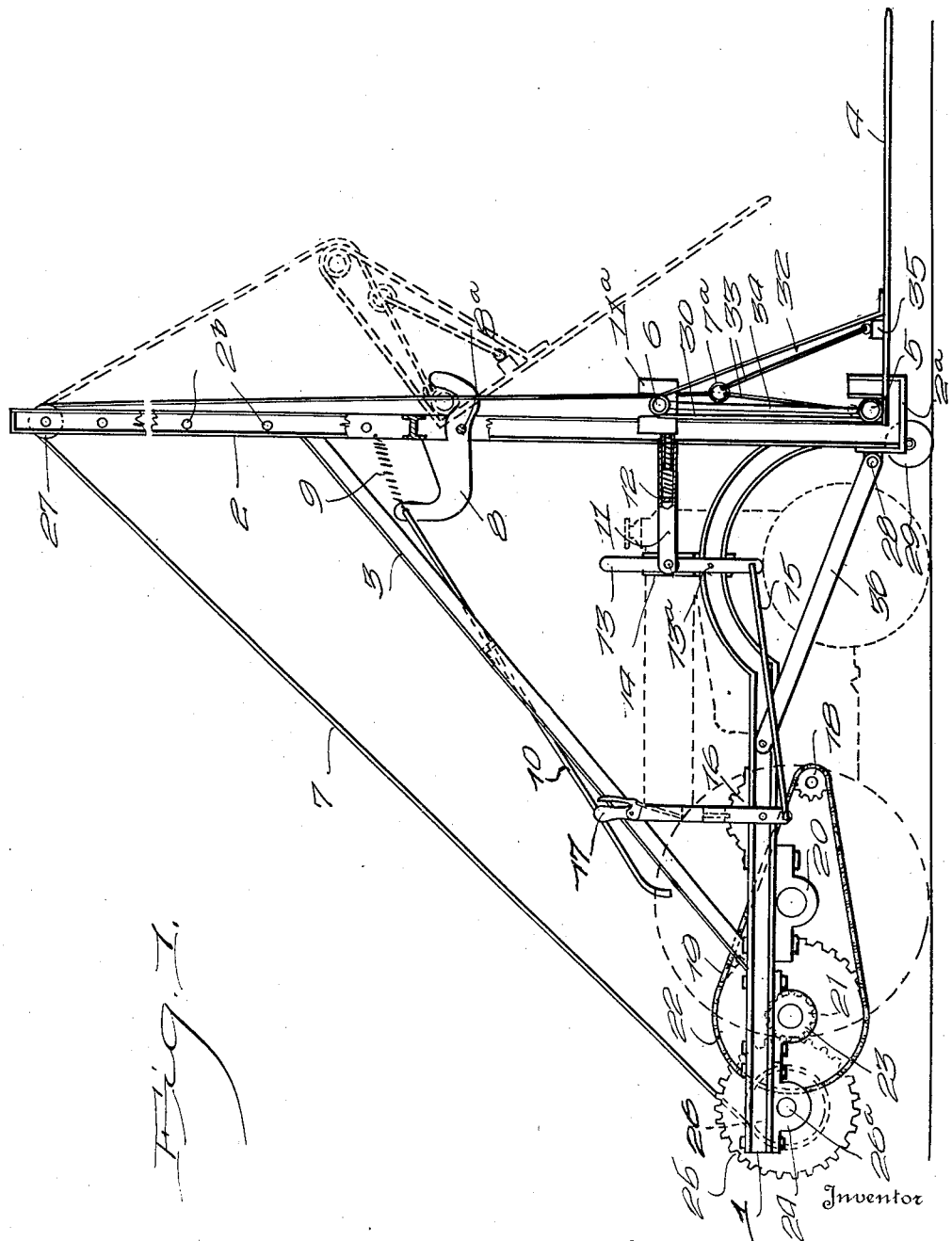
Figure 1 is a side elevational view of my stacker and loader.
Figure 2:
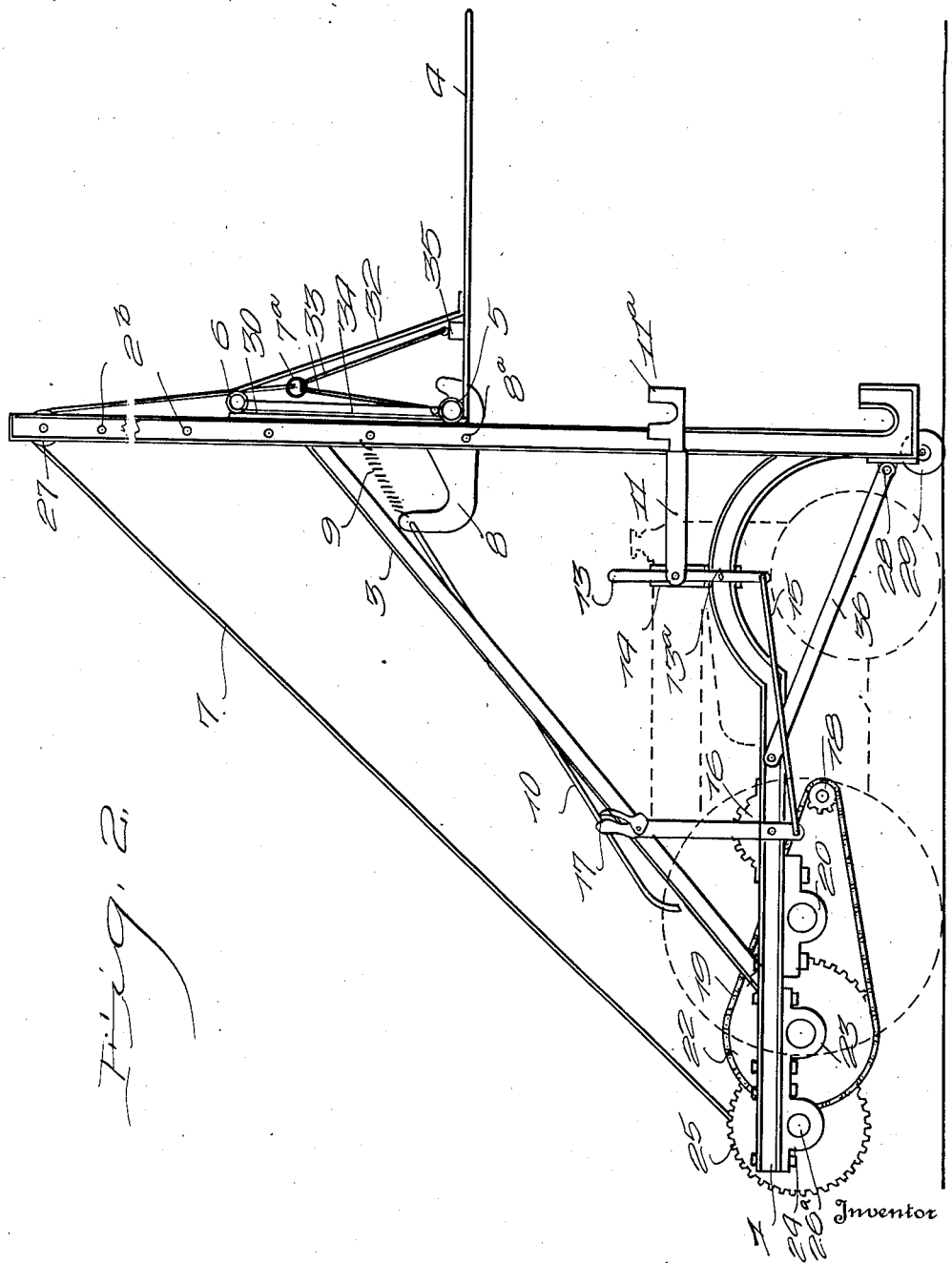
Figure 2 is a similar view shown in adjusted position.

Like reference characters indicate like parts throughout the specification and in the several views, in which 1 indicates side members of a harness for the tractor, the tractor being shown in phantom or dotted lines. The harness members 1 are braced with upright beams 2 and by angle irons 3. Rake prongs 4 are carried by a pair of hollow shafts 5 and 6, the shaft 6 being the smaller. The prongs 4 are braced together by a cross bar 35 and the shafts 5 and 6 are interconnected by back slats 30.

At the lower end of the side beams 2 are hooks 2ª carrying the shaft 5 and further up on the said beams 2 are a like pair of hooks 11ª except that the hooks 11ª are horizontally slidable by means of a bar 11 yieldingly separated from the hook 11ª by a compression spring 12. The bar 11 is in turn by a yoke lever 13 pivotally mounted at 13ª to the side beams 1 and moved by a link 15 actuated by a hand lever 17 and set upon a ratchet 16. By a movement of the lever 17 it is obvious that the relative angle of the prongs 4 is changed and also that there is a play or yielding area of varying angularity by reason of the spring 12. The prongs are lifted by a cable 7 attached by a ring 7ª to four bars or links 33 the forward pair of which are attached to the cross bar 35 and the rearward of which are attached to the shaft 5. The cable 7 passes in front of the shaft 6, and thence over a sheave 27 and downward over a drum 26, the drum 26 being held in fast or loose relation by a clutch to the shaft 26ª, which shaft carries fixably mounted thereto a gear 25 driven by a pinion 21, the shaft 25 being carried by a journal box 24 depending from the member 1. The shaft carrying the pinion 21 is also journalled in a depending box 23 and carries also a fixedly mounted sprocket 22 which drives the shaft, the sprocket being driven by a chain 19, which chain is driven by a smaller sprocket 18 carried by the tractor normally. Members 1 are mounted to the rear axle of the tractor by depending boxes 20 and supported at the front end by a yoke 14 which extends over and rests upon the front end of the tractor. All that is necessary therefore in mounting this attachment to the tractor, is to slightly elevate the same, and run the tractor thereunder and then lower and adjust the bearing boxes 20, the strap or yoke 14 seating itself in a similar manner to the back band of a harness on a horse. When the chain 19 is slipped over the sprockets 18 and 22 the attachment is ready for work, all of which is done in a very few seconds.

The upright beams 2 are tied together by slats or rungs 2ᵇ serving both as braces and the rungs of a ladder for climbing the derrick and are further braced by brackets 27ª carrying the sheave 27 and are further braced by brace rods 32 and a truss rod 34 and the beams 1 and 2 are relatively braced at the lower end of the beam 2 by rods 36 connected to a bottom cross brace rod 28 which carries 3 casters 29. Carried substantially midway or at any desired position on the upright beams 2 are a pair of trips 8 yieldingly held in a downward position at the downward limit of their movement by a spring 9 and movable upon a pivot 8ª with the front or hook portion movable upward and inward out of the path of the shafts 5 and 6 by a hand rope 10, or automatically where members 5 or 6 bear against under side in going up, when the shaft has passed the position of the member 8 the hook may drop into the path of the member 5 and will serve as a bearing for the member 5 upon which it will turn and by the loosening of the cable 7 the prongs 4 will drop and release the load, and on the other hand after the load has been released the pull upon the cable 7 will again elevate the member 5 so that the member 8 may be tripped by the rope 10 out of the path of the member 5 so that the rake may be lowered.

It will be seen, therefore, that the tractor may be driven forward in which event the prongs 4 may serve as a rake or if desired as a fork and the load elevated to any predetermined position and the tractor may then again be driven forward to place it over the top of a stack from which it may be dumped and if necessary the tractor may be backed so that the horizontal movement is controlled by the wheels of the tractor.

In the modification shown in Figure 5, I mount upon the brace rod 3 a pair of dolly boxes or journal members 50 and 51, the member 51 being carried upon a bracket 52 as well as upon the brace rod 3, the bracket 52 extending into a brace 53, the brace 53 connecting the brace 3 and the I-beam 1. Carried in the journals 51 is a shaft 54, and carried in the journal 50 is a shaft 55, the shaft 54 carrying suitable driving mechanism for driving the shaft 55, the shaft 55 carrying a drum 56. The shaft 54 is suitably connected with the shaft 18 by a chain 19ª similar to the chain 19.

I claim:

1. In combination, a track, a rake provided with an upper and a lower shaft, a bearing for the lower shaft at the base of the track, a bearing for the upper shaft and means for moving the upper bearing horizontally.

2. An elevator comprising a tractor provided with a rear axle having a housing and side members connected to the housing and extending forwardly and down with the ends turned up, and a prong member adapted to be elevated and to rest in the turned up ends.

3. In combination, a shaft, prongs secured to the shaft, an upper shaft, braces interconnecting the shafts in perpendicular and angular relation, the whole forming a unit, guides secured to said shafts, uprights forming a track for said shafts, the guides adapted to rest in between the uprights and form a bearing while the unit is raised or lowered.

In testimony whereof I affix my signature.

WILLIAM H. KEMPER.